US012621173B2

(12) United States Patent
Maurya et al.

(10) Patent No.: US 12,621,173 B2
(45) Date of Patent: May 5, 2026

(54) SYSTEM AND METHOD FOR MULTI-TENANT SESSION MANAGEMENT OF CRYPTOGRAPHIC DEVICES

(71) Applicant: THALES DIS CPL USA, INC, Austin, TX (US)

(72) Inventors: Sunil Maurya, San Jose, CA (US); Robert Fitzpatrick, Hertfordshire (GB)

(73) Assignee: THALES DIS CPL USA, INC., Austin, TX (US)

( * ) Notice: Subject to any disclaimer, the term of this patent is extended or adjusted under 35 U.S.C. 154(b) by 165 days.

(21) Appl. No.: 18/425,865

(22) Filed: Jan. 29, 2024

(65) Prior Publication Data

US 2025/0247258 A1     Jul. 31, 2025

(51) Int. Cl.
| *H04L 9/40* | (2022.01) |
| *H04L 9/32* | (2006.01) |
| *H04L 67/141* | (2022.01) |

(52) U.S. Cl.
CPC .............. *H04L 9/40* (2022.05); *H04L 9/3234* (2013.01); *H04L 67/141* (2013.01)

(58) Field of Classification Search
CPC ........ H04L 9/40; H04L 9/3234; H04L 67/141
See application file for complete search history.

(56) References Cited

U.S. PATENT DOCUMENTS

| 8,543,830 | B1 | 9/2013 | Khattar | |
| 9,344,455 | B2 | 5/2016 | Himawan et al. | |
| 9,602,275 | B2 * | 3/2017 | Grobman | H04L 9/083 |
| 11,023,619 | B2 | 6/2021 | Buendgen | |
| 2014/0006793 | A1 * | 1/2014 | Donovan | G06F 21/42 713/182 |
| 2017/0339070 | A1 * | 11/2017 | Chang | H04L 67/562 |

OTHER PUBLICATIONS

International Search Report (PCT/ISA/210) and Written Opinion (PCT/ISA/237) mailed on Apr. 24, 2025 by the European Patent Office as the International Searching Authority for corresponding International Application No. PCT/US2025/013127—[17 pages].

* cited by examiner

*Primary Examiner* — Clayton R Williams

(57)     ABSTRACT

Provide is a system and method for root of trust and dynamic session management of cryptographic devices servicing cryptographic requests from multi-tenant applications in a cryptographic computing environment is provided. The system comprises a Connection Manager to provide low-latency cryptographic operations, a Cache Store to support multi-tenancy, a Session Scheduler to provide high-throughput cryptographic services, and a Session Health Monitor to provide resiliency. The system tracks a state of the PKCS11 sessions and revises session assignments of client applications depending on whether a PKCS11 session with the cryptographic device is busy or in a range of error states, and detects, classifies and remedies multiple error situations occurring within a prepared Pool of session blocks in view of the health metrics to provide improved cryptographic operation performance. Other embodiments disclosed.

14 Claims, 7 Drawing Sheets

100

100

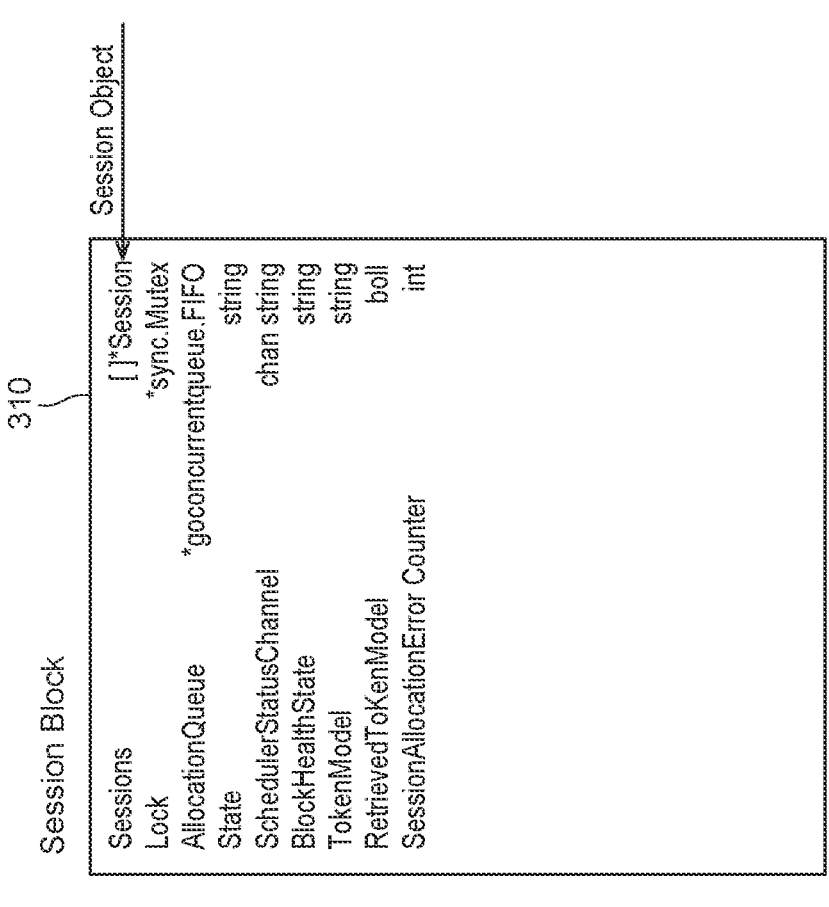

Session Object

| 310 | Session Block | |
|---|---|---|
| | Sessions | [ ]*Session |
| | Lock | *sync.Mutex |
| | AllocationQueue | *goconcurrentqueue.FIFO |
| | State | string |
| | SchedulerStatusChannel | chan string |
| | BlockHealthState | string |
| | TokenModel | string |
| | RetrievedToKenModel | boll |
| | SessionAllocationError Counter | int |

| 300 | 200 Session Object | |
|---|---|---|
| | LibPath | string |
| | Host | string |
| | SlotSerialNumber | string |
| | Context | *pkcs11.Ctx |
| | SessionHandle | pks11.SessionHandle |
| | ObjectMap | map[string]pkcs11.ObjectHandle |
| | InUse | bool |
| | M | syn.RWMutex |
| | Index | int |
| | useCounter | int |
| | SlotNum | unt |
| | State | string |
| | HealthCheckStatusChannel | chan string |
| | HealthState | string |
| | SlowRecently | bool |
| | LastSlowTime | time.Time |
| | UsageErrorCounter | int |
| | SessionCreationTime | time.Time |
| | HSMOpTimeThresholdMS | int64 |

Fig. 2

Figure 3:
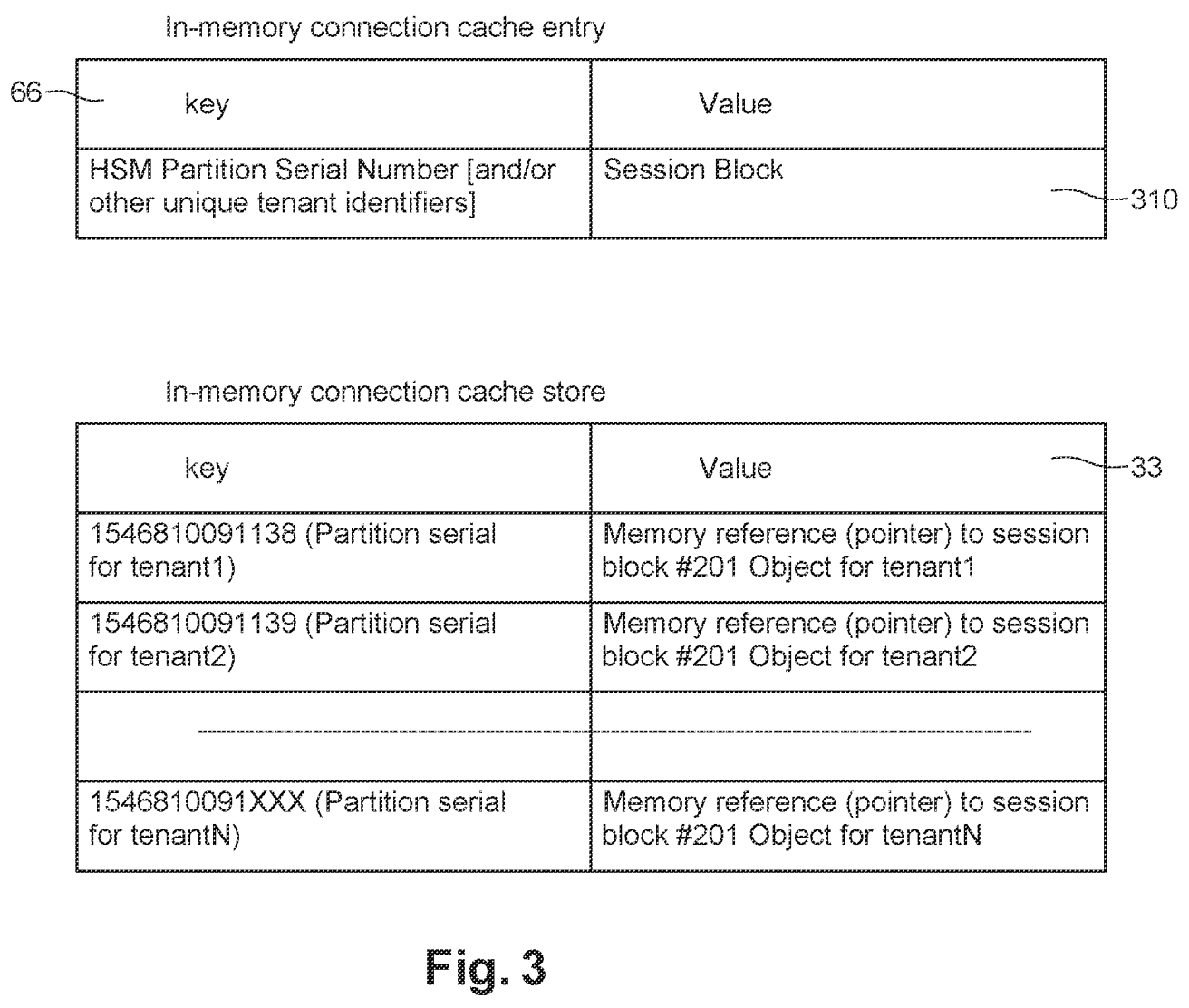

In-memory connection cache entry

| key | Value |
|---|---|
| HSM Partition Serial Number [and/or other unique tenant identifiers] | Session Block |

310

66

In-memory connection cache store

| key | Value |
|---|---|
| 1546810091138 (Partition serial for tenant1) | Memory reference (pointer) to session block #201 Object for tenant1 |
| 1546810091139 (Partition serial for tenant2) | Memory reference (pointer) to session block #201 Object for tenant2 |
| | |
| 1546810091XXX (Partition serial for tenantN) | Memory reference (pointer) to session block #201 Object for tenantN |

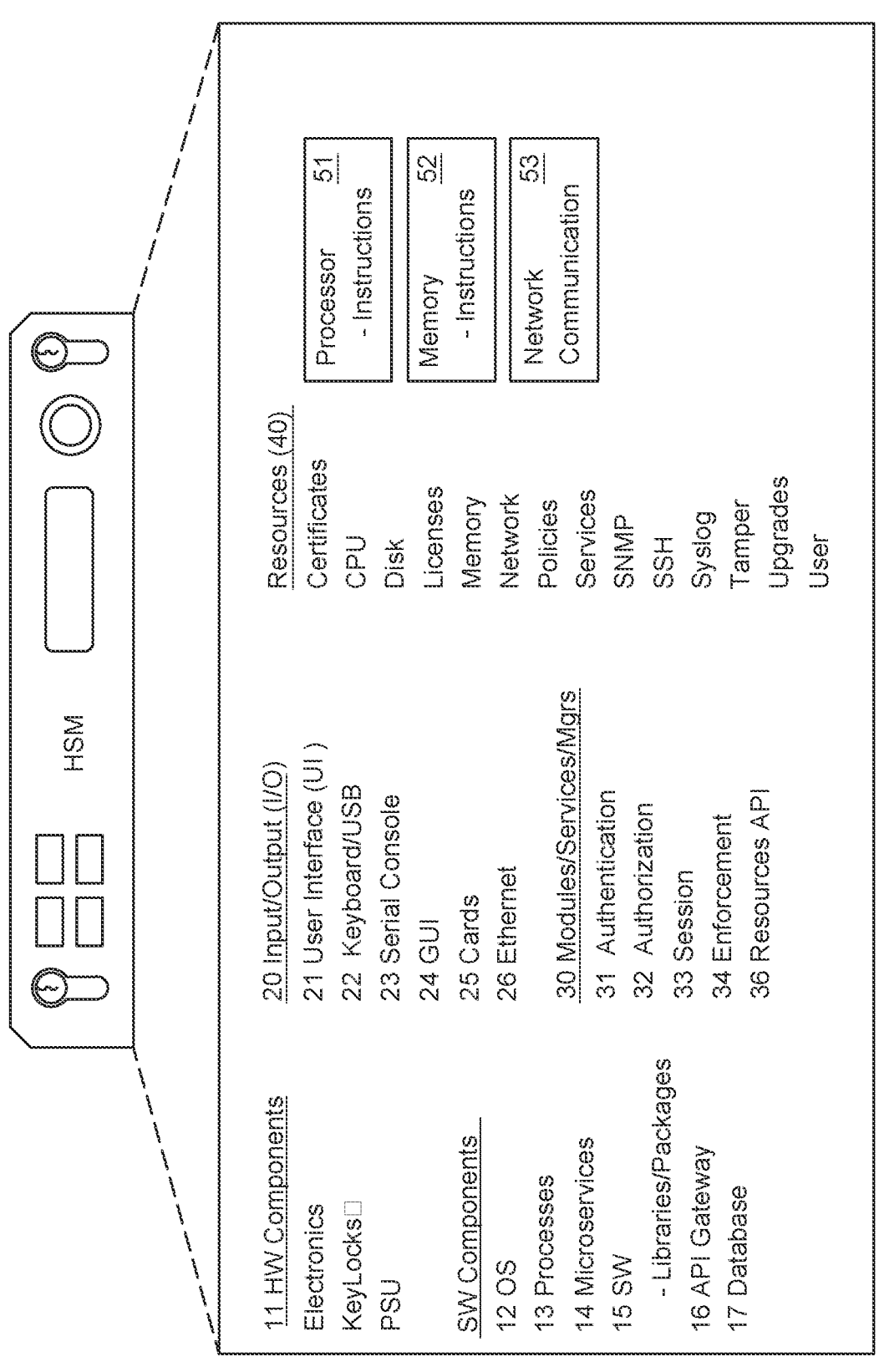

HSM

11 HW Components

Electronics
KeyLocks☐
PSU

SW Components

12 OS
13 Processes
14 Microservices
15 SW
  - Libraries/Packages
16 API Gateway
17 Database 20 Input/Output (I/O)

21 User Interface (UI)
22 Keyboard/USB
23 Serial Console
24 GUI
25 Cards
26 Ethernet 30 Modules/Services/Mgrs 31 Authentication
32 Authorization
33 Session
34 Enforcement
36 Resources API Resources (40)

Certificates
CPU
Disk
Licenses
Memory
Network
Policies
Services
SNMP
SSH
Syslog
Tamper
Upgrades
User Processor 51
  - Instructions Memory 52
  - Instructions Network 53
Communication

SYSTEM AND METHOD FOR MULTI-TENANT SESSION MANAGEMENT OF CRYPTOGRAPHIC DEVICES

TECHNICAL FIELD

The present invention relates generally to cryptographic device applications, and more particularly, to improving performance of session management for multi-tenant applications communicating with cryptographic devices.

BACKGROUND

Cryptographic devices include hardware security modules (HSMs), USB based cryptographic tokens and smart cards. Different cryptographic devices have different capabilities in terms of the storage of cryptographic objects and also for performing different cryptographic operations. These devices generally perform two types of functions: storage of cryptographic objects such as asymmetric keys, symmetric keys and X509 certificates, and performing cryptographic operations, for example, asymmetric key pair generation, symmetric key generation, hashing, encryption/decryption and signing.

Applications that need to access the cryptographic devices may use the PKCS #11 interface, since cryptographic device vendors commonly implement this API model in their products. PKCS #11 defines a standard API model for accessing the cryptographic objects and performing different cryptographic operations. Applications communicate with a cryptographic device over one or more PKCS #11 sessions. A session provides a logical connection between the application and the cryptographic device. After it opens a session, an application has access to the objects of the cryptographic device for performing cryptographic functions and operations.

A Hardware Security Module (HSM) is one type of dedicated crypto processing device that supports PKCS #11 and is specifically designed for the hardware protection of cryptographic keys. HSM "partitions" are independent logical HSMs that reside within the HSM. Each HSM Partition has its own data, access controls, security policies, and separate administration access. Applications may be assigned to partitions that once connected are referenced as a numbered slot. In some arrangements, an HSM cluster managed by a single server application is used by various services and applications via HSMaaS (HSM as a Service) model. These cloud-based and network-attached HSMs can be used by a large number of clients/tenants and thus need to have the capability of allowing for multi-tenancy. Accordingly, multi-tenant applications need to interface with multiple HSMs' partitions. However, communicating with HSMs in a timely manner requires maintaining numerous PKCS #11 sessions, but on-demand creation of such sessions is 'costly'. That is, creating and managing these sessions, including handling multiple error scenarios and recovery, poses serious challenges around HSM management, tenant isolation and resiliency. These challenges are compounded by latency and throughput requirements.

Accordingly, there is a need for a system for root of trust management with dynamic session management providing improved performance in multi-tenant applications with respect to latency, throughput, and resiliency of cryptographic requests and operations.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

Provided herein is a system and method for establishing and maintaining a potentially-large number of PKCS #11 sessions, such that low-latency and high-performance requirements are satisfied, multiple session error situations are automatically detected, classified and remedied where possible, and where session performance metrics are continually captured, all while maintaining and enforcing tenant isolation. This provides an improvement in performance and processing capability for servicing application requests and handling session management between multi-tenant applications and respective cryptographic devices, including, but not limited to HSMs, USB based cryptographic tokens and smart cards.

In some embodiments a System for root of trust and dynamic session management of cryptographic devices servicing cryptographic requests from multi-tenant applications in a cryptographic computing environment is provided. The system comprises one or more processors and memory operatively coupled to the one or more processors, wherein the memory includes computer instructions which when executed by the one or more processors causes the one or more processors to perform the operations of a Connection Manager, a Cache Store, a Session Scheduler, and a Session Health Monitor.

In some embodiments the Connection Manager provides low-latency cryptographic operations on one or more Cryptographic Devices that are local or remote to the System by creating a block of multiple PKCS11 sessions to ensure that a usable logged in a PKCS11 session is available and ready to use for crypto operations, assigning these session blocks to tenant partitions of said one or more Cryptographic Devices to service incoming requests from one or more client applications for performing said crypto operations, and allocating incoming requests to PKCS11 sessions from a Pool of these session blocks for handling these crypto operations in real-time to achieve low-latency and high-throughput.

In some embodiments the Cache Store is associated with said Connection Manager to support multi-tenancy by tracking of individual tenant's partition mapping to their respective session blocks, managing lifecycle of said individual tenant's connection along with its sessions to said one or more Cryptographic Devices.

In some embodiments, the Session Scheduler provides high-throughput cryptographic services on said one or more Cryptographic Devices by selecting a correct and usable session block from said Cache Store, assigning an available PKCS11 session from said session block to service the crypto operations scoped to individual client/tenants of the Cryptographic Device(s).

In some embodiments, the Session Health Monitor to provides resiliency by evaluating health metrics related to the Session Scheduler and a set of PKCS11 sessions in the prepared Pool of session blocks scoped to individual tenant, reporting an assessment of overall session block health, and remediating and self-repairing session blocks in the event of a range of session errors.

In some embodiments, the Connection Manager in association with Session Health Monitor tracks a state of the PKCS11 sessions and revises session assignments of client applications depending on whether a PKCS11 session with the cryptographic device is busy or in a range of error states, and detects, classifies and remedies multiple error situations occurring within a prepared Pool of session blocks in view of the health metrics. This minimizes latency and maximizing availability of the cryptographic device services by way of the revised session assignments in view of the overall session block health.

In some embodiments, the Session Scheduler returns a PKCS11 session to an 'available' state in the session block once that PKCS11 session is done servicing crypto operation, and making that session re-useable for further crypto ops requests without closing it.

In some embodiments, the Session Scheduler in association with Session Health Monitor maintains individual PKCS11 sessions in an open state after tenant use for as long as possible to maintain the pool and so as to be available for use by an established client application.

In some embodiments, the Connection Manager creates a PKCS11 session on demand, and at a certain point in time is assigned to a particular tenant on the cryptographic device for exclusive and permanent use with that tenant.

In some embodiments, Session Scheduler runs in a loop whereby it waits until an incoming request is present in the queue, then extracts it from the queue, examines the amount of time the request was in the queue, wherein if the request was in the queue for a predetermined time, it is discarded, and thereafter, finds a 'free' PKCS11 session in the session block, wherein if one is found, the request is assigned to the PKCS11 session and invokes the callback mechanism with details of the PKCS11 session, and thereafter; updates the health status of the block, examining the age of errors and resetting the error state of the block when applicable.

In some embodiments, incoming requests comprise a payload such as an operand along with a connection specification, and a requested cryptographic operation such as an encrypt, decrypt, or signing.

In some embodiments, the Cryptographic Device is one or more of a Hardware Security Module (HSM), USB based cryptographic token and smart card.

In some embodiments, the Connection Manager dynamically manages a setup, configuration, and life cycle of per tenant clients and their associated PKCS11 sessions.

In some embodiments, the Connection Manager asks the Session Scheduler to allocate a PKCS11 session for a tenant, and execute the crypto operation on the Cryptographic Device, but, if the PKCS11 session is not available for the tenant, it will create a session block with open PKCS11 sessions exclusively for that tenant to use, and then used PKCS11 sessions will be returned to the pool for that session block for that tenant for later use, without closing or terminating the PKCS11 session.

In some embodiments, the Session Scheduler with the Cache Store and Session Health Monitor efficiently manages a large number of PKCS11 sessions on behalf of multiple tenants or applications to service large volume of crypto requests at one or more partitions of said one or more Cryptographic Devices.

In some embodiments, the Connection Manager with the Cryptographic device's client dynamically establishes and maintains the life cycle of a secure communication channel with the Cryptographic Device for one or more tenants by way of adding a dedicated connection and removal, for example, over Transport Layer Security (TLS), and then provides for PKCS11 Application Programming Interface (API) call support over said secure communication channel to service crypto requests for one or more tenants.

In some embodiments, the Session Scheduler with Session Health Monitor tracks a range of errors during PKCS11 session usage and allocation, and repairs and remediates as necessary to ensure a healthy pool of PKCS11 sessions.

In some embodiments, the Session Scheduler processes and handles session allocation requests from a session allocation request queue, wherein said requests are dequeued sequentially by waiting for a session allocation request for a PKCS11 session, and then receiving the request, and, upon dequeuing, performs a check operation to determine a length of time the request was in said queue, wherein, if too much time has passed since said request was received, applies a configurable threshold so that if said request was in the queue for a time matching or exceeding said threshold, it discards or drops said request.

In some embodiments, the Session Scheduler, before attempting to wait for and dequeue a further request, examines a state of the session block, and, upon determining if the state is ACTIVE, waits for said further request, and if not, exits, otherwise, on dequeuing said further request and passing a queue time-residency check, examines the pool of sessions to determine whether a compatible PKCS11 session is available, and, if no such compatible PKCS11 session is available within an allotted timeframe, an error is returned, and if such a PKCS11 compatible session is available, assigns that session to said further request and sets a variable for the session indicating that it is in USE.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 2 depicts a session object and session block in accordance with some embodiments;

FIG. 3 depicts an in-memory connection cache entry and cache store in accordance with some embodiments;

FIG. 6 depicts exemplary components of a Hardware Security Module (HSM) in accordance with one embodiment.

Specific embodiments in this invention have been shown by way of example in the foregoing drawings and are hereinafter described in detail. The figures and written description are not intended to limit the scope of the inventive concepts in any manner.

DETAILED DESCRIPTION

Reference will now be made in detail to exemplary embodiments, examples of which are illustrated in the accompanying drawings. The following description refers to
the accompanying drawings in which the same numbers in
different drawings represent the same or similar elements
unless otherwise represented. The implementations set forth
in the following description of exemplary embodiments do
not represent all implementations consistent with the inven-
tion. Instead, they are merely examples of apparatuses and
methods consistent with aspects related to the invention as
recited in the appended claims.

The term, PKCS #11 standard defines a platform-inde-
pendent API to cryptographic tokens, such as hardware
security modules (HSM) and smart cards. The PKCS #11
Cryptographic Token Interface Standard, also known as
Cryptoki, is one of the Public Key Cryptography Standards.
PKCS #11 is used as a low-level interface to perform
cryptographic operations without the need for the applica-
tion to directly interface a device through its driver. PKCS
11 represents cryptographic devices using a common
model referred to simply as a token. An application can
therefore perform cryptographic operations on any device or
token, using the same independent command set. It provides
an interface to one or more cryptographic devices that are
active in the system through a number of "slots". Each slot,
which corresponds to a physical reader or other device
interface, may contain a token. A token is typically "present
in the slot" when a cryptographic device is present in the
reader. These slots reside on a Cryptographic Device, for
example, including but not limited to, a Hardware Security
Module (HSM), USB based cryptographic token and smart
card. The term PKCS11 "session" refers to a communication
between an application, program, client or other module
with a cryptographic device. A PKCS11 session (also
referred herein as a "PCKS11 or PKCS #11 session" or
"session") provides a logical connection between the appli-
cation and the token.

Figure 1:
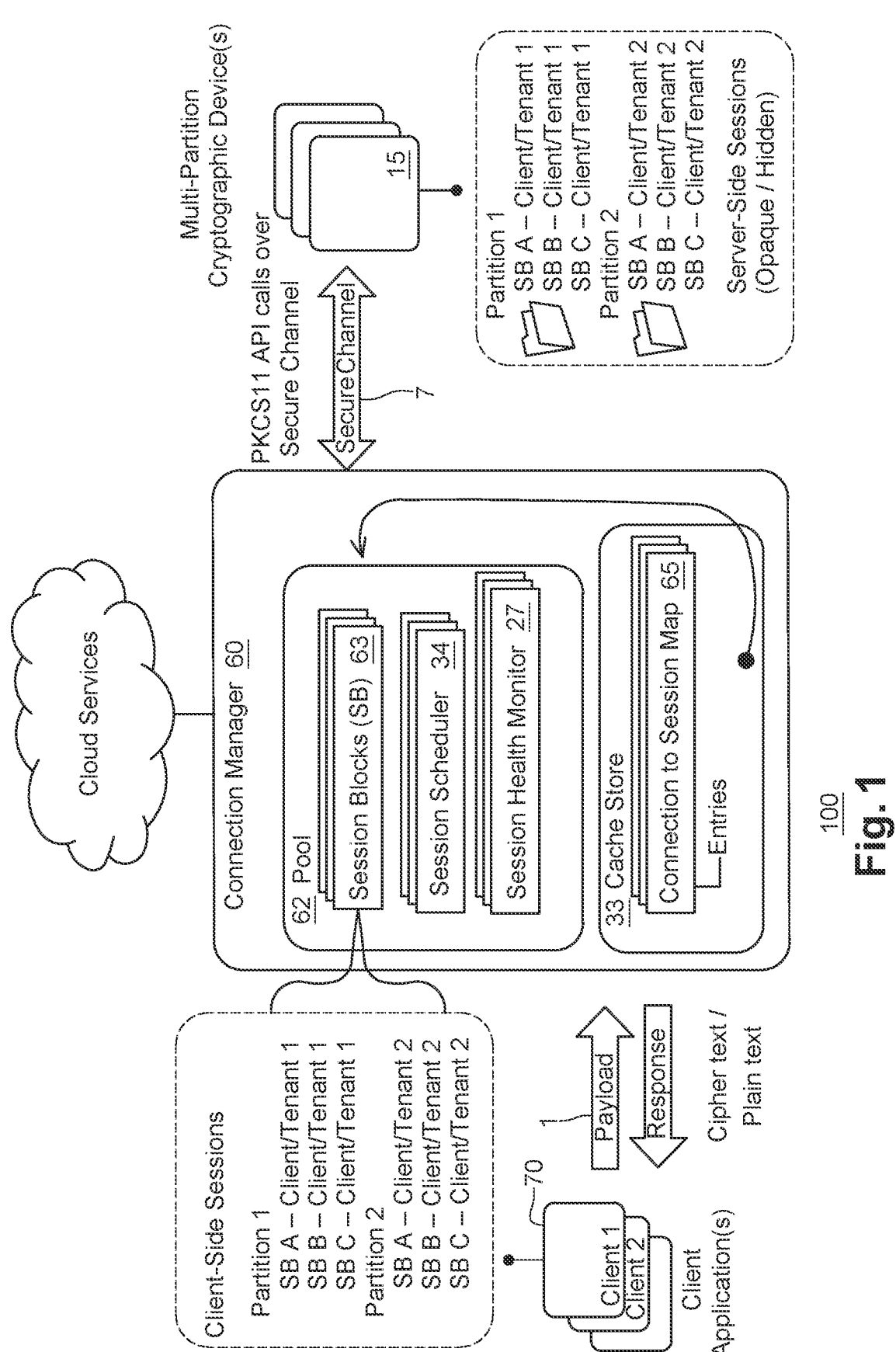
FIG. 1 depicts a system for root of trust and dynamic session management providing low latency, high-throughput, resilient cryptographic operations in multi-tenant applications in accordance with some embodiments.

FIG. 1 depicts a system 100 for root of trust and dynamic
session management providing low latency, high-through-
put, resilient cryptographic operations in multi-tenant appli-
cations in accordance with embodiments. The system 100
comprises one or more Cryptographic Devices 15, a Con-
nection Manager 60, and one or more Applications 70. The
Cryptographic Device 15 may be one of a Hardware Secu-
rity Module (HSM), USB based cryptographic token, PCIe
card, smart card, or other appliance implementing public-
key cryptography or other cryptographic operations. This
device 15 can be used to store the private-key component of
a public-key/private-key pair securely and is one component
of a Public Key Infrastructure (PKI) implementation.
Although one embodiment uses AES symmetric key, other
symmetric key algorithm such as DES, 3DES as well as
asymmetric keys are contemplated for technical enablement.
The system 100 interacts with Cryptographic Device 15 on
behalf of client applications 70. For example, a client
application makes a request for operations 4 (see FIG. 4A),
such as encrypt or decrypt, over a secure TLS channel to
system 100. System 100, specifically Cryptographic Device
client also sometimes called HSM client which is setup at 21
(see FIG. 4A), interacts with the Cryptographic Device 15
over a secure channel, for example, usually TLS though
sometimes uses a proprietary secure channel, depends on
type of Cryptographic Device 15.

Once the secure connection is established, PKCS #11 API
calls are made over this secure channel. A PKCS #11 session
is a logical connection or context established between HSM
client (shown at 21 in FIG. 4A) and a cryptographic device
(HSM server) 15. It represents an interactive relationship
between the HSM client and 15 for the purpose of performing cryptographic operations, managing keys, and other
security-related tasks. In this way, the Cryptographic Device
15 can be said to service the crypto requests of multiple
applications (multi tenants) through this system 100 that
manages large number of PKCS11 sessions on behalf of
these tenants/applications 70 in an efficient manner. Man-
aging a large number of PKCS11 sessions for multiple
tenants/applications 70 is challenging and that's one of
major problem we have solved through this invention. It
should also be noted that client applications 70 never
receive/get to interact with pkcs11 directly. System 100 does
that for them. They send payload 1 and typically receive http
(JSON) response that contains the encrypted/plain text for
encrypt/decrypt operation 4.

Various clients, or customers, will have their own custom
applications 70 for communicating crypto requests to the
Cryptographic Device 15. Each of these clients may be
allocated as a tenant to a partition of one or more Crypto-
graphic Devices 15, for example, an HSM partition. And
each client application will require a PKCS11 session for the
purpose of performing cryptographic operations on 15. One
main drawback of PKCS11 sessions is that they can take
considerable time to set up, maintain and manage. More-
over, they can fail in many ways due to their fragile nature.
They are also synchronous; namely, in general, one session
can handle a single request at any given time. With thou-
sands of clients and crypto demand requests per second a
different asynchronous and dynamic session based manage-
ment paradigm is contemplated.

Accordingly, embodiments of the invention herein intro-
duce unique components within the system 100 to overcome
crypto request latency and availability problems. It com-
prises the Session scheduler 34, Session Health monitor 27,
pool 62 of session blocks, and cache store 33 that together
handle the complexities and added handling, scalability and
the auto remediation required of a low-latency high-through-
put multi-tenant application. Together they dynamically
manage the setup, configuration, and life cycle of per tenant
PKCS11 session block 310 where each tenant is a unique
user/customer/client 70 in multi-tenant application. Each
such tenant has an established root-of-trust (key) in unique
tenant partition at cryptographic device 15. A root-of-trust
key is setup in the partition.

The Connection Manager 60 and components therein each
individually or collectively comprises one or more hardware
processors and memory coupled to the one or more hard-
ware processors, wherein the memory includes computer
instructions which when executed by the one or more
processors causes the one or more processors to perform the
specialized operational steps of the components, or modules
associated therewith, for example, the Session scheduler 34
and Session Health monitor 27. Similarly, the Cryptographic
Devices 15 one or more processors and memory coupled to
the one or more processors, wherein the memory includes
computer instructions which when executed by the one or
more processors causes the one or more processors to
perform its specialized operational steps, for example, as an
HSM, Smart Card, or Token.

In yet another embodiment, a computer program product
includes a non-transitory computer-readable storage
medium containing computer program code, the computer
program code when executed by one or more processors
causes the one or more processors to perform specialized
operations similar to the methods and flowcharts described
herein by the Connection Manager 60 and components
therein, Cryptographic Devices 15, and associated systems,
modules or components, individually or collectively, with respect to FIGS. 1-6. In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The computer program can also be realized as a hardware implementation, design, or electronic circuit. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system, methods, modules and component operations are applicable to, and realizable as, not only software, firmware, embedded code, but also, and hardware implementations.

To achieve low-latency, the specialized operations of system 100 creates block of multiple PKCS11 sessions at step 20 (see FIG. 4A) to best ensure that a usable PKCS11 session for a tenant is available and ready to use for HSM crypto ops 4 whenever tenant/user/application 70 demands it. System 100 manages logging into PKCS11 session 300 with crypto user's PIN at step 26. This is initiated on demand whenever a crypto ops 4 request is first received for a specific tenant and then later periodically repeated as per flow from steps 28→23 and steps 31→23 (see FIG. 4A-4B). These are seen as Session Blocks (SB) 63, which can be dedicated to particular clients or consumers, and are available in a pool 62. For example, partition A of the Cryptographic Device 15 may have session blocks 1 and 2, with each session block being used for a different client. Session Blocks C and D may be assigned to clients 1 and 3 respectively. System 100 maintains tenant scoped HSM clients at 21 which overcomes limitation of few Cloud HSM service such as Luna HSMOD (HSM on demand), for example, where any newly added partition/slot for a tenant otherwise could require use of session blocks overcomes the limitation of existing services, such as a Cloud HSM on-demand (OD) service. This provides for high throughput crypto operations and fault tolerance, thereby ensuring a logged-in PKCS11 session is always available for use that is anchored to individual assigned Cloud HSM partitions. This ensures that new tenants can start using the crypto services offered through this system 100 as soon as they subscribe and establish their tenancy at 15.

To support multi-tenancy, the Cache Store 33 keeps track of individual tenant's partition mapping to their respective session blocks. Accordingly, the Cache Store 33 includes a connection to session Map 65 used by Session Scheduler. The objects in the cache store 33 are pointers (as shown by the arrow) to Session Blocks 63, including all underlying sessions, monitors etc. Each session block contains multiple PKCS11 session as shown in 310, and all of these session in this block belongs to this 1 tenant only. FIG. 1 shows tenant isolation is maintained all the time as seen in the partitions, for example, Partition 1 includes session A for client/tenant 1, session B for client/tenant 1, session C for client/tenant 1; and Partition 2 includes session A for client/tenant 2, session B for client/tenant 2, and session C for client/tenant 2. Here, the above Session Blocks (SB) for A,B,C are HSM (server) side sessions for client 1. Their equivalent system 100 side, constitute block of sessions 63 for a tenant. For example, here one entry in 65→1 tenant/1 customer/1 HSM partition at 15→1 session block (each session block contains multiple pkcs11 session as shown in 310. all of these session in this block belongs to this 1 tenant only.) Similarly another entry in 65 would belong to another tenant's session block.

The Cache Store 33 dramatically increases the performance of all tenants' root-of-trust crypto operation by actively managing in-memory cache of a session block 320. Briefly, PKCS #11 session is a logical connection or context established between HSM client (shown at 21) and a cryptographic device (HSM server) 15. It represents an interactive relationship between the HSM client and 15 for the purpose of performing cryptographic operations, managing keys, and other security-related tasks." these session block can also be considered as a connection object. This connection object act as a live copy of PKCS11 session linked to a unique cloud HSM partition per tenant. Briefly, FIG. 3A shows an example of a session object 300 and a session block 310. In a preferred embodiment, it is an in-memory connection cache store that functions as a thread-safe lookup table. For example, once a PKCS11 session is created, threads of a given application have access to the same sessions and the same session object through the lookup table.

The entry keys used are lookup keys which contain the details and potential use-cases of the Cryptographic Device 15 partition data (e.g., HSM serial number) and optionally the details of the client, or customer. These lookup keys help to enforce tenant/client separation, along with the dedicated session blocks for consumers, even when using the same HSM partition. Again, for example, partition A may have session blocks 1 and 2, with each session block being used for a different client. Briefly, FIG. 3B shows an example of an in-memory cache entry with key-value pairs, for example, showing the key with value of session block 310 (associated with a session object 300 in FIG. 3A) and an in-memory connection cache store 33 comprising key and value pairs.

The Session Scheduler 34 provides high-throughput for multi-tenant application requests to the Cryptographic Device 15. It is responsible for matching incoming requests to a session among a set of sessions. This is non-trivial since the sessions can be busy and in a range of error states. Thus, the Session Scheduler 34 keeps track of the state of the sessions and makes the optimal session assignment. The Session Scheduler 34 selects the correct session block from the Cache Store 33, then assign an available session to service the crypto ops scoped to individual client/tenants. Once completed, the PKCS11 session is returned to an 'available' state, allowing it to be re-used for further crypto ops requests.

The Session Health Monitor 27 continually monitors and dynamically tracks Session Block 63 health, and takes remedial actions taken in the event of a range of session errors. Like the Session Scheduler 34, the Session Block 63 itself is a unique object, which includes a state (e.g., create, open, free, ready, close, replace, shut down, etc.), a performance and quality metric (e.g., successful, active, unavailable, slow, fast, degraded, etc.) an error counter related to PKCS11 session status and state (e.g. fail, repair, fix, etc.) of the respective Session Block 63. To this point, Session Health Monitor 27 makes use of these several metrics to present a simplified assessment of overall session block health.

The Connection Manager 60 and components therein provide notable benefits and advantages. For example, it continually monitors, reassigns and self-repairs PKCS11 sessions to reduce down-time while servicing application requests. This enhances product reliability, performance and efficiency. Introduction of the Session Scheduler 34 and Session Health Monitor 27 in conjunction with the Session Block 63 and Cache Store 33 improve session quality and resiliency with lower latency thereby improving request-response performance from the client application perspective. Other novel interactive details on how these components interoperate together will be discussed ahead in FIG. 3.

Figure 4A:
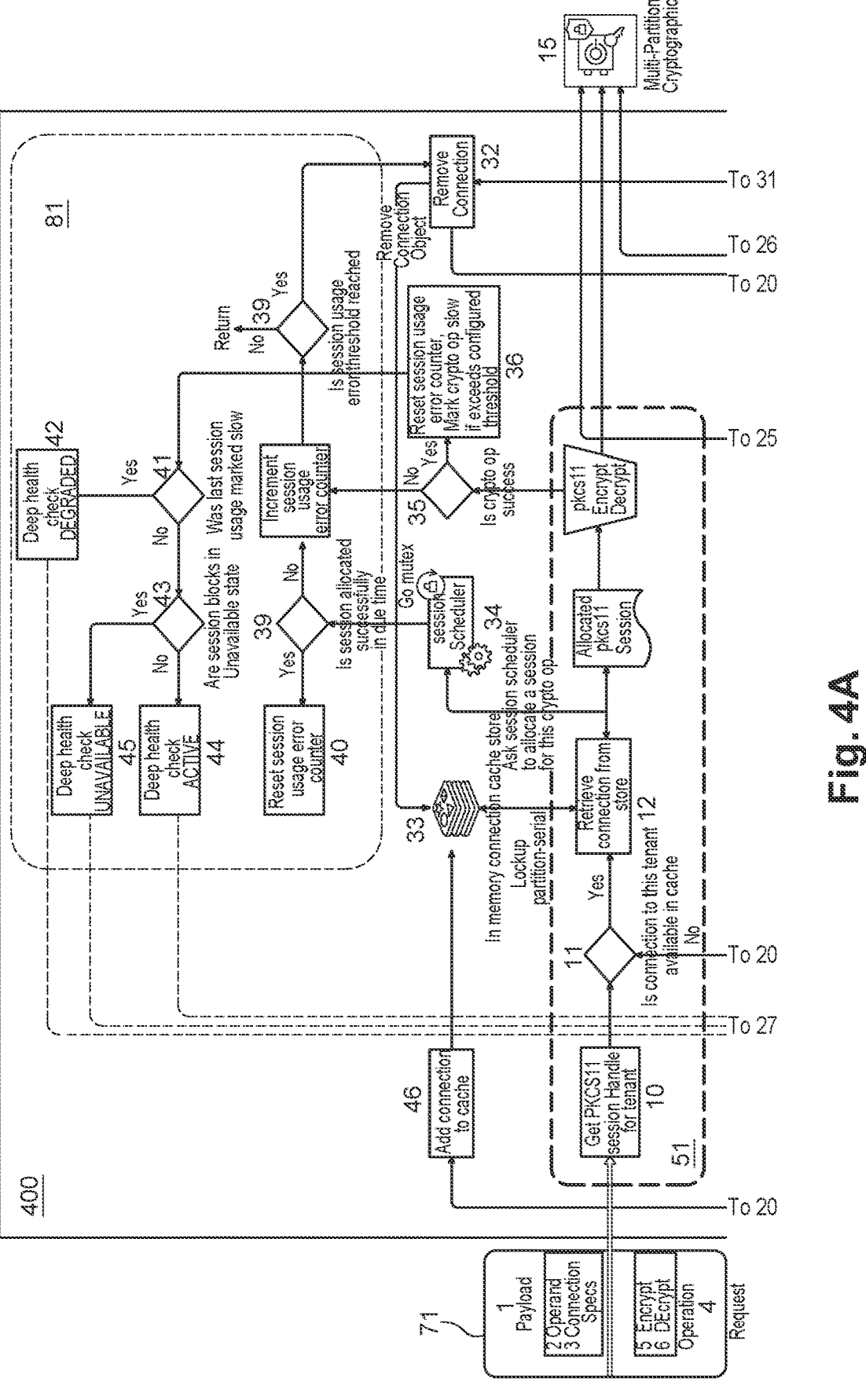
FIGS. 4A and 4B together illustrate a flowchart 400 of a method for root of trust and dynamic session management of cryptographic devices servicing cryptographic requests from multi-tenant applications in a cryptographic computing environment in accordance with some embodiments.
Figure 4B:
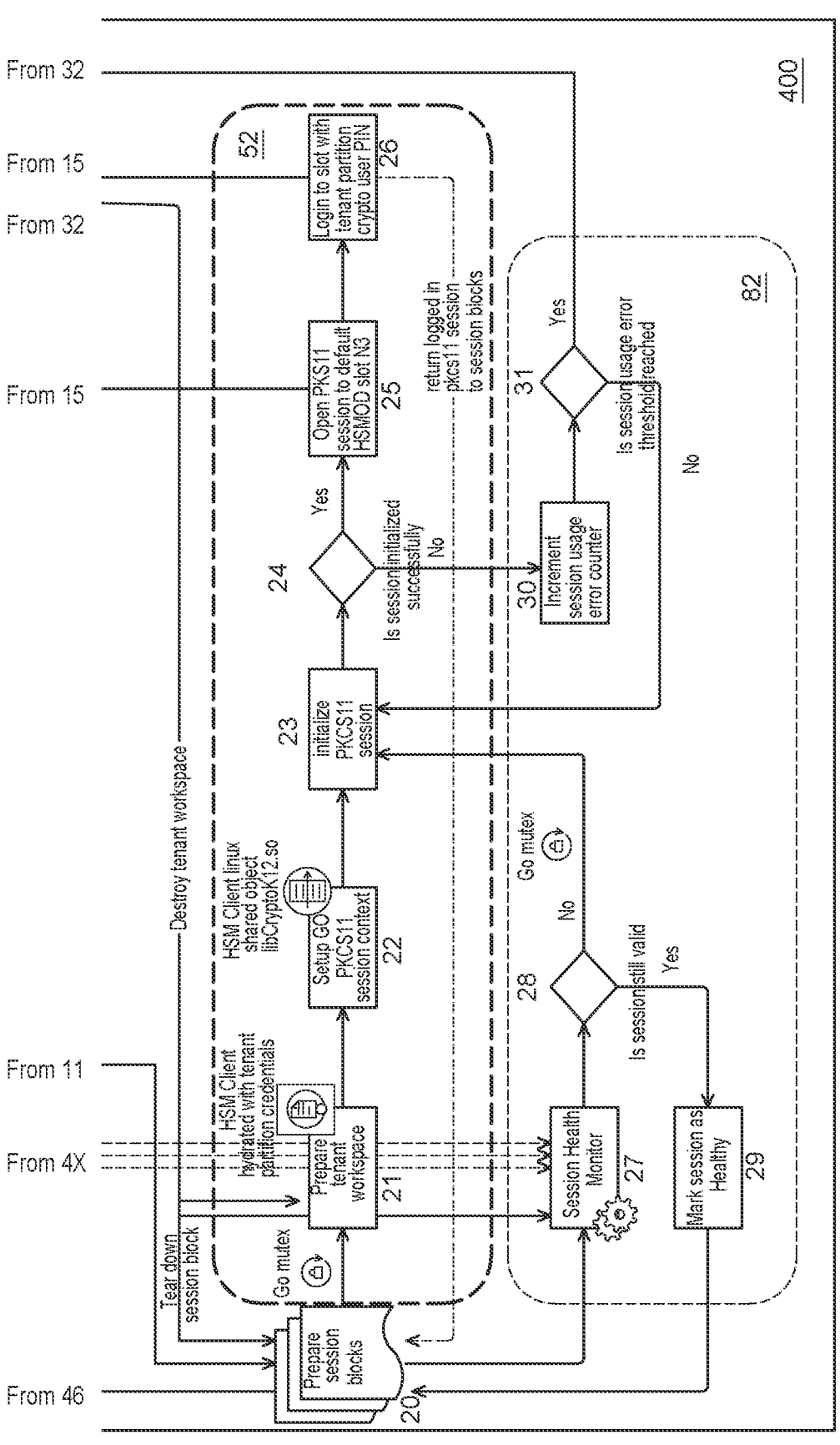

FIGS. 4A and 4B together illustrate a flowchart 400 of a method for root of trust and dynamic session management of cryptographic devices servicing cryptographic requests from multi-tenant applications in a cryptographic computing environment. The method can be practiced by the components of the Connection Manager 60 shown in FIG. 1 and may include more or less than the number of steps shown. When describing method 400, reference will be made, and may alternate, between FIGS. 4A and 4B since the two diagrams together represent the flowchart.

Briefly, the process block 51 with components 10-14 of FIG. 4A are generic steps for allocating a session, and the process block 52 with components 21-26 of FIG. 4B are generic steps for session management. In some embodiments, all the components can be run as Go microservices that run as containerized workloads, such as Docker container or Kubernetes containers. Moreover, all components are technically enabled via one or more processors and memory operatively coupled to the one or more processors, wherein the memory includes computer instructions which when executed by the one or more processors causes the one or more processors to perform the operations of the method steps. Certain connections into and out of the process 51 and 52 are innovative improvements that provide the aforementioned advantages and performance improvements related to low-latency, high-throughput and resiliency servicing of crypto requests and discussed next in detail.

Looking at the left side of FIG. 4A, the input to the flowchart 400 starts with the request 71 from the application 70. When the request first arrives at step 10 for the HSM crypto operations, it includes the payload which contains the operand and connection details used for session creating, checking and maintenance. In some embodiments, data is sent as part of an HTTP request. This data can be included in the body of the request and can take various forms, such as JSON. The payload carries the actual information that this system 100 processes for desired operations. A first part of the payload is an operand which gets processed through system 100. This is usually a plain text (secret) that needs to be protected through encrypt operation #5 or the ciphertext (encrypted text) that gets decrypted and returned as plain text during decrypt operation #6. The connection details within the payload relate to HSM service endpoint details (host, port etc.), unique partition identifier such as partition serial number that is associated with unique individual tenant in this multi-tenant capable system 100, unique Client ID and Client Secret that is required to access unique partition in multi-partition HSM service of the cryptographic device 15, unique Crypto User credential (PIN) (per partition/tenant) which is required to login to HSM slot as shown in step 26.

Thereafter, further requests will include payloads that contain crypto commands, for example, an encrypt and decrypt operation, for the cryptographic device 15 to service. Operations are functions, such as encrypt 5 and decrypt 6 that are performed on operand 2 through this system 100. Recall the Connection Manager 60 includes a map 65 of individual tenants and their respective connections (see session objects and blocks in FIG. 3A) to unique HSM partitions in an HSM service of cryptographic device 15 at in-memory connection cache store 33 (see cache entry key-value pairs in FIG. 3B). When the request (e.g., http) is received for encrypt or decrypt operation 4 for a specific tenant, it attempts to retrieve the HSM session blocks that contains PKCS11 session handle associated with this tenant from in-memory connection cache store 33 (see FIGS. 3A and 3B).

At step 11, it first checks whether a session within the retrieved session block for this tenant is available for use; more specifically, it checks whether a corresponding session block is present in the cache store, and if so, it follows the generic standard procedure seen in steps 12-15. It will retrieve the session from the in-memory connection cache store 33 if it is available at step 12. Thereafter, it will ask the Session Scheduler 34 to allocate a session for this crypto operation. Each block of sessions has an associated scheduler. The Session Scheduler 34 allocates the PKCS11 session at step 13, for example, for crypto operations (e.g., generate key pairs, encrypt, decrypt, etc.). For example, at step 14, it calls encrypt or decrypt function on HSM service 15 on operand 2 using allocated PKCS11 session in step 13 and connection specs 3 from the payload. The session scheduler 34 reads incoming requests from a queue. When a request is placed in the queue, a 'callback' mechanism is part of this request.

Briefly, the primary responsibility of the session scheduler 34 is matching incoming requests to PKCS #11 sessions which can service the requests. A secondary responsibility of the session scheduler is to update the 'health state' of the session block as described ahead. The session scheduler runs in a loop whereby it: waits until an incoming request is present in the queue, then extracts it from the queue, and examines the amount of time the request was in the queue. If the request is in the queue for a certain threshold (e.g., 2.5 seconds or more), it is discarded. The session scheduler 34 then tries to find a 'free' session in the session block. If one is found, the request is assigned to the session and invokes the callback mechanism with details of the session, for example, as seen in step 13. The session scheduler 34 then updates the health status of the block, examining the age of errors (if any) and resetting the error state of the block if applicable.

PKCS11 API call are made over secure channel, so for this case, at step 14 encrypt/decrypt PKCS11 API call are made, for example, with the help of Go package/library to 15. And then actual encoding and decoding happens inside the cryptographic device 15. In the case where the cryptographic device 15 is a multi-partition HSM, a unique root-of-trust key or encryption key resides for each tenant in an unique partition. Partition provisioning, CRYPTO USER credentials (PIN etc.) setup, along with creation of root-of-trust key or encryption key for each tenant is created through an external process. This multi partition HSM service can reside in cloud 16, offered through managed cloud services such as HSM-on-Demand (HSMOD), other reputable Cloud HSM services, as well as can reside in on-premise Network HSM or embedded physical HSM PCIe cards 17. This addresses the standard flow for process block 51 to execute cryptographic operations enc/dec and other operations at step 15.

If however the connection manager 60 determines that a session is not available for this tenant at step 11, it will try to create a block of PQCS 11 sessions at step 20. On successful creation of block of sessions, it launches Session Health Monitor (a Go routine) 27 which continually monitors the health of these sessions. Thereafter, it will follow the costly standard procedure of process block 52 (steps 21 to 26). At step 21, it prepares the unique tenant workspace directory with HSM client configured with required connection parameters and credentials needed to communicate to unique HSM partition for this tenant at 15. These connection parameters and credentials are supplied through connection specs 3. The HSM client contains the shared object library (such as libcryptoki2.so) and configuration template file that gets hydrated with tenant partition's connection parameters and credentials.

At step 22, it sets up a new context and initializes the aforementioned HSM client shared object library for use. Here it may use a third party Go implementation of the PKCS #11 API which is used in steps 13, 14, 22, 23, 25 and 26. After setting up the GO context at step 22, it will initialize the session at step 23, for example, using Cryptoki (Cryptographic Token Interface) library. Then, if the PKCS 11 session was initialized successfully it opens the PKCS11 session to HSM token at a desired HSM slot (for example slot #3). Then finally at step 26, it logs in to the specific slot using the tenant partition crypto user personal identification number (PIN). Here, the login logs crypto user into HSM token with its PIN. On successful login, it returns the logged in PKCS11 session back to block of sessions at step 20. Briefly, slots are the logical partitions in the cryptographic device. In case of HSMs, there could be hundreds or more slots are available while in the case of smart cards, there could be only one slot available. If the application issuing the request is successfully logged in, the session is returned back to the pool of PKCS 11 session blocks at step 20 upon the servicing of the request. It is then finally added to the connection caches as shown in step 46 so that it can be used later again at step 33 to service subsequent requests.

Here, in step 46, a new set of sessions for this client/tenant/partition combination is created. Each session is opened to the HSM and logged in. Simultaneously, a scheduler for the session block is launched, along with a health monitor thread for each session. Following completion of this step, the session block is ready to handle incoming requests. Notably, since a number of transient errors may occur during this step, these errors can be ignored and avoid being reflected in the health status of the block. Thus, for the first few seconds, session and/or allocation errors can be ignored to avoid spurious session block DEGRADED/UNAVAILABLE reports.

Briefly, taking a few steps back to when a request is received, if for example, the Connection Manager 60 received a thousand requests, but only had one PKCS 11 session open to handle all the requests, then all those requests would have to be backed up and handled one at a time using the single session. The latency would be intolerably excessive. To overcome this latency issue and accommodate such requests the introduction of the Session Scheduler 34 ensures that sessions are available at any given time. Here, for instance, if there is only partition, a block of 16 sessions that are all identical would be provided and made available in the pool 62. And then when a burst of requests arrives, the session scheduler for the assigned tenant block would best evaluate available sessions and assign one for those requests. More specifically, for example, if there are 16 sessions available that are all connected to the same partition, and 17 requests come in for that partition, then all 16 sessions will be used to handle the requests, with one such session handling 2 requests. And, once the request is handled, it is thereafter returned to the pool 62; an approach that results in and maintains high-throughput.

Moreover, sessions are blocked together in the pool 62 and assigned a single session scheduler 34 to provide robustness and ensure tenant isolation; a critical security aspect. The management of these sessions in bulk provides for the servicing thousands of requests per second and meeting the low-latency and high-throughput requirements. Here again, the in-memory cache store 33 advantageously keeps track of individual partitions and individual tenants therein, and maps requests for those partitioned tenants to the correct block of sessions to ensure tenant isolation.

On successful addition of the PKCS 11 session block to the pool at step 20, the Connection Manager 60 also launches the Session Health monitor 27. The job of the Session Health monitor 27 is to continuously monitor the health of sessions for all tenants, capture the performance metrics and keep the block of sessions healthy as it continuously checked if the session is still valid or not. In some embodiments, the Session Health Monitor 27 is a Go routine that continually monitors the health of the sessions in the session block. It tracks the error during session usages and initializes if necessary to auto-remediate the session errors. It also captures the latency metrics for the session usages that gets reflected through session health state (Healthy or Degraded) depending upon the configurable threshold for latency.

At step 28, the Session Health Monitor 27 retrieves the pkcs11 session info, for example, using any PKCS #11 API function or any sequence of functions that can ensure ongoing session health/connectivity. Then it checks the metrics, and if the session is valid, it marks the session as healthy at step 29. To enforce the tenant isolation and successful session initialization in multi-tenant environment, HSM client shared object library may require mutex while working with pkcs11 sessions. Otherwise, if the session is not valid, if not healthy, it goes ahead to step 23 to try and re initialize the block of sessions through 23. Here, it also checks for any errors encountered during the initialization. It will increment the session usage error counter for any identified errors at step 30, and will attempt to re-initialize the session if a usage error threshold is no, or has not, reached. If it determines it has already reached the threshold at decision step 31, the process flows to step 32 to remove the session. Here the connection is removed because the session is not considered healthy for future use. So, it will take immediate action to destroy the tenant workspace. It will tear down all the session blocks and also remove the connection object from the in-memory connection cache store 33 (along path from 32 to 33).

When a connection removal is triggered, the entry in the connection-to-session map is immediately removed, preventing servicing of any further requests for this connection. Following this, a session shutdown message is created and is sent to the session scheduled for this set of sessions. Once the scheduler receives this message, it sets the state of the session block to "Shutting down". The scheduler is then terminated, with the state of the session block then being set to "Shut down". Concurrently, in response to the "Shut down" status of the session block, a routine is launched for each existing session. In these routines, an attempt is made to assume control of the session thread. If successful, the session is terminated along with the corresponding health-check thread. These operations involve communicating with the HSM partition to indicate that the session is closing. Additionally, the unique client library copy corresponding to the thread is deleted. Following these steps, the session block scheduler no longer exists and neither do any of the session or health-check threads. Further, the client library directories no longer exist.

The Session Health monitor 27 continually monitors of all the sessions for errors in order to provide system resiliency. To this point, process group 81 in FIG. 4A and process group 82 in FIG. 4B with the steps therein together constitute a resiliency section whereby the Session Health 27 will auto-matically repair or replace in the pool 62 of session blocks 63 for one or more sessions that go into a failed or stale state. Recall, the Connection Manager 60 allocates, on demand, block of sessions for multiple tenants asynchronously that can be used for adjacent crypto operations in an scalable manner. The Session Health monitor 27 augments this block session pooling functionality with proper error handling and auto remediation functionality as seen in flowchart elements 35 to 45.

For example, if at decision block 39 a session is allocated successfully in due time, the session allocation error counter is reset at step 40. If a session could not be allocated in the permissible time (e.g. 5 seconds), the session block error counter is incremented, and a further decision block 39 is evaluated, to determine if the session use threshold is reached at which point the connection is removed at step 32. Similarly, after decision block 35, for successful crypto operations, a performance metric is updated, for example, to mark the crypto counter slow if it exceeds a configured threshold. If the crypto operation was successful but slow, the session block is marked as degraded. This leads to decision block 41 and 43 to assess whether the last session was marked slow and if session blocks are in unavailable states, respectively. Session block health is set to DEGRADED, allowing external monitors/clients to detect potential issues and/or capacity limitation. The session block is also DEGRADED if some (but not all) sessions are in an error state. Otherwise, the session block health status is set to ACTIVE at step 44 if there have been no 'slow' operations within the last X seconds (e.g. 10 seconds).

With respect to steps 35/36 there are three outcomes following each PKCS #11 crypto operation (e.g., encrypt/decrypt): 1) the operation succeeded within the permissible time, 2) the operation succeeded but not within the permissible time, and 3) the operation failed. In the second case (2), a configurable "HSM operation time threshold" is used to determine whether the operation completed fast enough. If not, the corresponding session is marked as "slow recently". This label persists for 10 seconds, following which it may be cleared if a subsequent operation using the session is within the permissible time (cases 1 & 3). In the first case (1), if the session had previously been labelled as "slow recently", this label is cleared. If a non-zero error count is present for this session, it is cleared and reset to zero. In the case of 3, at step 37 an error counter is incremented, and at step 38, the session error threshold is handled. Here, if the error counter reaches a configurable threshold, the session block is destroyed and removed and a replacement session block created. Otherwise, the error is examined and, in some cases, re-initialization of the session and retry of the crypto opera-tion is attempted (see step 23 for session initialization/re-initialization).

The health and resiliency metrics and evaluation decisions with process blocks 81 and 82 ensure that a usable PKCS 11 session is always available and ready to use for HSM crypto operations for any tenant in a scalable manner. In such regard the Connection Manager 60 as shown in FIG. 1 with the Session scheduler 34, Session Health monitor 27, pool 62 of session blocks, and cache store 33 together handle the complexities and added handling, scalability and the auto remediation required of a low-latency high-throughput multi-tenant application architecture seen lacking in the generic process block 51 for allocating a session, and process block 52 for session management.

In some embodiments, for example, the Connection Man-ager 60 is provided as a micro-service running as contain-erized workload in a Kubernetes cluster that dynamically manages the setup, configuration, and life cycle of per tenant HSM clients. This Connection Manager service is aug-mented with the Cache Store 33 inside the same microser-vice to dramatically increase the performance of all tenants' root-of-trust crypto operation by actively managing an in-memory cache of session blocks. This Cache Store 33 is further complemented with a Session Health Monitor 27 running in same micro-service to maintain the health of PKCS11 sessions and ensure that a crypto user of an on-demand cryptographic service that is logged into a PKCS11 session for each tenant is always ready to serve the crypto operation for individual tenants. Together, the com-ponents of the Connection Manager 60 provide a low-latency high-throughput architecture to handle the com-plexities and added handling, scalability and the auto remediation required for session management of multi-tenant applications on cryptographic devices.

Figure 5:
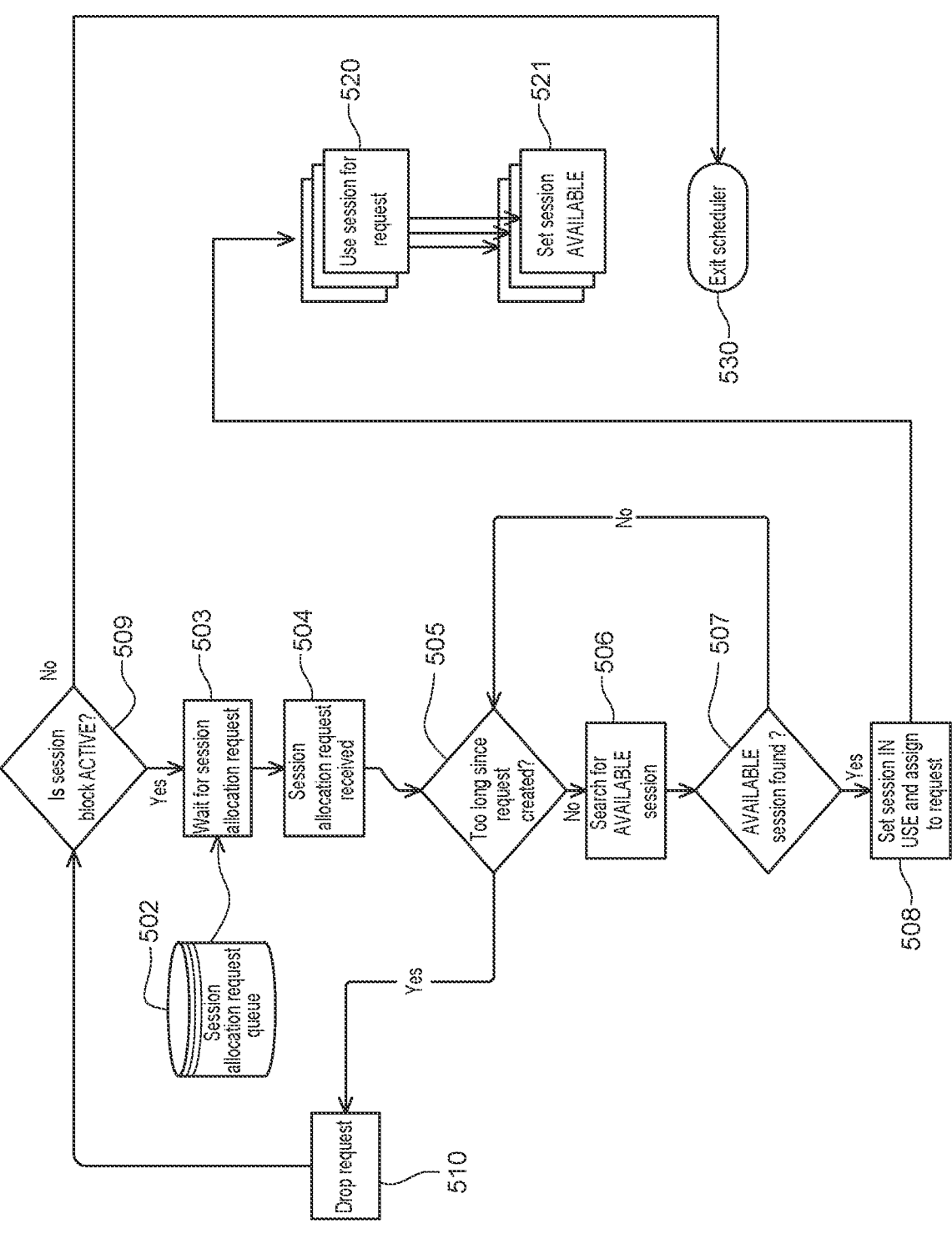
FIG. 5 depicts a flowchart for a method of operation of a Session Scheduler that processes and handles session allocation requests in accordance with some embodiments.

FIG. 5 depicts a flowchart for a method 500 of operation of a Session Scheduler 34 that processes and handles session allocation requests in accordance with some embodiments. When describing the method 500, reference will be made to components shown in the previous figures, and may include more or less than the number of components and steps shown.

The method 500 can start at step 502, at which time the Session Scheduler 34 processes and handles session alloca-tion requests from a session allocation request queue. These requests are dequeued sequentially, as shown in steps 503 and 504, when available. For example, at step 503 it waits for a session allocation request, and then receives the session allocation request at step 504. Then, upon dequeuing, at step 505, it performs a check operation to determine the length of time the request was in the queue, for example, if too much time has passed since the session allocation request was received. It applies a configurable threshold so that if the request was in the queue for a time matching or exceeding this threshold, the Session Scheduler 34 will discard/drop the request at step 510.

Before attempting to wait for and dequeue a further request, a state of the session block is examined at step 509. If this is ACTIVE, the scheduler waits for a further request at step 503, as shown by the yes decision, and if not, as shown by the no decision, the Session Scheduler 34 exits at step 530. On dequeuing said further request and passing a queue time-residency check, at step 505, the Session Sched-uler 34 examines the relevant pool (see 62) of sessions to determine whether a compatible session is available at step 506. If no such session is available within an allotted timeframe, an error is returned. If such a session is available, the scheduler assigns the session to the further request and sets a variable for the session indicating that it is in USE at step 508; that is, in an USE state. Following this, the Session Scheduler 34 communicates the details of the session to external functions and then it returns to step 509 to monitor session block activity.

FIG. 6 depicts exemplary components of the Hardware Server Module (HSM). The HSM 10 is a physical computing device that, among other capabilities, safeguards and manages digital keys, performs encryption and decryption functions for digital signatures, and provides for strong authentication and other cryptographic functions. As a security hardened unit, the HSM 10 records tamper evidence, such as visible signs of tampering or logging and alerting, and provides for tamper responsiveness such as deleting keys upon tamper detection. The HSM 10 contains one or more secure crypto processor and sensor chips to prevent tampering and bus probing, or a combination of chips in a module that is protected by the tamper evident, tamper resistant, or tamper responsive packaging.

The HSM 10 is in effect a computer system comprising one or more processors 51 and memory 52 coupled to the one or more processors, wherein the memory 52 includes computer instructions which when executed by the one or more processors causes the one or more processors to perform the operations of the methods described herein. The HSM may be connected over the network to other machines via the network communication 53 device interface. In a networked deployment, the machine may operate in the capacity of a server or a client user machine in server-client user network environment, or as a peer machine in a peer-to-peer, or distributed, network environment.

While the machine-readable memory 52 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

A "general purpose" (GP) HSM is a hardened, tamper-resistant hardware device that strengthen encryption practices by generating keys, encrypting and decrypting data, and creating and verifying digital signatures. GP HSMs may be assembled in clusters and act as a single hardware Root of Trust. It is a critical component of public key infrastructures (PKIs) to generate and protect root and certificate authority keys; code signing to ensure software remains secure, unaltered and authentic; and creating digital certificates for credentialing and authenticating proprietary electronic devices for Internet of Things (IoT) applications and other network deployments. A General Purpose HSM is flexible and can be used in any application that uses cryptographic keys which does not require the additional security controls and regulations imposed by a Payment HSM. Examples include management of the symmetric keys used for database encryption, and management and use of the asymmetric keys used for the creation of digital signatures and certificates to support PKI (Public Key Infrastructure) and crypto wallets.

A "payment" HSM is a hardened, tamper-resistant hardware device that is used primarily by the retail finance or banking industry to provide high levels of protection for cryptographic keys and customer PINs used during the issuance of magnetic stripe and EMV chip cards (and their mobile application equivalents) and the subsequent processing of credit and debit card payment transactions. Payment HSMs normally provide native cryptographic support for all the major card scheme payment applications and undergo rigorous independent hardware certification. Payment HSMs and management tools provide flexible, efficient transaction security for retail payment processing environments, internet payment applications, and web-based PIN delivery.

An HSM "Appliance" is a physical computing system that, like other HSMs, among other capabilities, safeguards and manages digital keys, performs encryption and decryption functions for digital signatures, and provides for strong authentication and other cryptographic functions. As a security hardened unit, an HSM Appliance records tamper evidence, such as visible signs of tampering or logging and alerting, and provides for tamper responsiveness such as deleting keys upon tamper detection. An HSM Appliance has added capabilities to connect to an IP network, asynchronously generate events, run a web server, and any other processes that can run on a general purpose motherboard.

In some embodiments an HSM Appliance includes therein a PCIe card as an independent tamper protected module with its own security scope and certification. The HSM Appliance may be designed or configured as either, or both, a general purpose HSM or a payments HSM. A "cloud HSM" provides same functionality as HSM Appliances with the benefits of a cloud service deployment, without the need to host and maintain on premises appliances. A HSM deployment can provide for Software as a Service (SaaS), Platform as a Service (PaaS), or Infrastructure as a Service (IaaS) models.

The main role of a payment HSM is to protect cryptographic keys and other security sensitive data in a highly secure manner, such that the integrity of the overall payment process is maintained, and provide audit and system logs of HSM usage. To that end, HSMs offer the highest level of security by always storing cryptographic keys in intrusion-resistant hardware and providing up to date reporting of its operation. Commonly, HSMs are housed in a data center of a computing resource provider or any similar securely hosting area. More specifically, any HSM hosted in the data center may be attached directly to a server, for instance in a rack, and can be accessed on-site by an operator e.g., through console attach to the HSM via a universal serial bus (USB) connection implementing a USB-C interface, for example.

Other HSM Embodiments

Operational use of the (GP or Payment) HSM 10 for establishing an End to End (E2E) trusted HSM setup using secure device as shown is primarily by way of the components shown in the figure, but understandably, many more components, electronics, and modules are present in a typical HSM. Those components shown are those mostly related, and suitable for use, for implementing the foregoing inventive methods. Hardware (HW) components 11 represent general electronics for operating the HSM (e.g., processors, central processing units, security, sensors, memory, network devices, ports, power supply units (PSU), wires, keylocks, etc.). The Hardware also contains memory to run operating system and input-output (I/O) devices for interaction. It comprises different types of processors, such as a crypto processor, security processor, general processing unit (GPU), central processing unit (CPU) to assist in protection, management of keys and hardware acceleration with the operating system. The keys, or any other data, can be stored in the database for persistence. The hardware architecture is designed to protect and manage digital keys, and can perform encryption, decryption, digital signature generation and verification.

In one embodiment, the aforementioned (GP or Payment) HSM 10 functionality and methods for the End to End (E2E) trusted HSM setup using the trusted device 5 is configurable as a micro-service. The customer configuration file is exposed via a micro-services API for End to End (E2E) trusted HSM setup using the trusted device.

Micro-services are independent and lightweight processes designed to perform specific tasks. They are typically handled and managed within the HSM by way of the OS 12. Micro-services 14 can communicate with each other and with external systems over specialized protocols and application programming interface (API) 16. Micro service are built using software libraries/packages 15, which are a self-contained set of independent and interchangeable software component that implement a specific functionality. Micro-services 14 and Processes 13 are built using these software libraries/packages 15. By way of these microservices, applications can implement a third-party Microservice provider's generic API to a service to deliver Payment HSM capabilities. In this manner, for example, a $3^{rd}$ party customer by way of APIs can partition their workload to optimized payment HSMs for performing specific tasks (e.g. ECC/RSA key gen, PIN translations, etc.) according to their microservice model. As another example, a micro-service with a customer facing API for an End to End (E2E) trusted HSM setup using the trusted device is contemplated. The API can include options allowing the customer to configure trust anchors and certificate chain management for generating and programming the secure content (e.g. IP addresses for network configuration setup) on their workstations and HSM cluster within the protected environment.

The Operating System (OS) 12 is a software component that executes on top of hardware, for example, the general processor, to manage hardware resources and peripherals, run HSM jobs/processes, and help in execution of other processes 13. Ubuntu is an exemplary OS that provides an embedded Linux distribution with libraries and packages. Ubuntu (GNU/Linux) is a multitasking Operating System capable of executing several processes (tasks) simultaneously. Different processes 13 for performing the HSM functions (data protection, key management, pin translations, etc.) are scheduled by the operating system 12. A thread is the basic unit to which the operating system allocates processor time. A process 13 is an instance of a computer program that is executed by one or many threads in the GPU or CPU. One or more threads run in the context of the process. A thread can execute any part of the process code, including parts currently being executed by another thread.

In another embodiment, an API 16 is provided for End to End (E2E) trusted HSM setup using the trusted device 5 when configured as a micro-service. The API can be a RESTful API using HTTP requests to produce and consume data related to network config services via at least one of a GET, PUT, POST, PATCH and DELETE command type. The API includes a command set for each stage of warranting, commissioning, and provisioning the HSM during initial set-up and for life-cycle HSM management, including but not limited to certificate management at each stage.

The Applications Programming Interface (API) 16 provides a connection between computers or between computer programs/applications, and/or between computers and people. It is a type of software interface, offering a service to other pieces of software. The API provides a communication channel between HSM components, internal processes 13 and/or micro services 14. These APIs are exposed on top of input/output (I/O) 20 interfaces. External systems and/or people communicate with HSM via the I/O interfaces 20, such as a basic user interface (UI) 21, or more sophisticated graphical user interface (GUI) 24 The HSM can also communicate with external systems through hardware IO interfaces, such as the keyboard 22, serial port 23, smart card 25, Ethernet 26, optical ports, USB ports, etc. External systems (host computers in a data center) can also talk to HSM software interface via APIs exposed on top of individual hardware interfaces (e.g., network device driver, disk/memory management, etc.).

The HSM 10 includes a local console 23 that is serial connected over e.g., a USB-C interface. The serial interface can be used by operations personnel, namely operators, referred to as DCOps (standing for Data Center Operations), who have physical access to the HSM for manually issuing commands to the HSM. Such USB-C interface is used, for all configuration throughout the HSM service, including initial configuration and cumbersome provisioning processes. The HSM also includes managerial Graphical User Interface (GUI) 24 that over an Ethernet 26 connection allow for remote configuration of the HSM. Also, the I/O 20 can be used to configure network settings, SSH certificates, upgrades, licenses and devices (e.g. CPU, Disk, memory, etc.). Operator (Java) cards 25 also provide a means for provisioning and securing the HSM using key shares and key splits.

The HSM also includes services 30 by way of modules, processes and service managers. Some services may be internal to the HSM, and others may be selectively exposed via the API gateway 16 to external entities or services. Examples of services 30 include authentication 31, authorization 32, session manager 33, enforcement 34, resource API manager 36, and quorum manager 37. Accordingly, service managers can be invoked/managed/configured remotely (external) via their APIs, for example, from a web based GUI via Internet connection over Ethernet to the HSM 10.

The HSM also includes (internal) resources 40 which can be externally configured via the normal I/O interfaces 20, and also, for some, (internally and externally) via any of the module/service managers 30 and their respective APIs. Examples of HSM resources include, but are not limited to, certificates, licenses, policies, device management, services, upgrades and so on. Each resource 40 has a respective API for software modules, processes or microservices to interact with the respective resource. The HSM offers access and services to each resource 40 via the resources API 36. Aside from payments HSM related tasks (e.g. encryption/decryption, key management, etc.), this includes: certificate/license management, SNMP, SSH, memory management/configuration, network management/configuration, upgrade installations/services, user resources, and so on.

The architectural style for APIs is typically categorized as either being SOAP (former acronym for "Simple Object Access Protocol", but referring now to a "Service Oriented Architecture", SOA for Web services) or REST (Representational State Transfer), and both are used to access Web services. While SOAP relies solely on XML to provide messaging services, REST offers a more lightweight method, using URLs in most cases to receive or send information. REST uses different HTTP 1.1 verbs, also known as access "methods" to perform tasks. These methods are GET, POST, PUT, and DELETE, which refers to the reading, updating, creating and deleting of operations concerning objects or resources, respectively. Unlike SOAP, REST does not have to use XML to provide the response. Some REST-based Web services output the data in Command Separated Value (CSV), JavaScript Object Notation (JSON) and Really Simple Syndication (RSS). The advantage with REST is that the output needed can be obtained in a form that is easy to parse within the language of the application specifically concerned.

In the embodiments of the invention presented herein, REST offers an alternative to, for instance, SOAP as method of access to a web service. In order to be used in a REST-based application, a web service needs to meet certain constraints. Such a web service is called RESTful. A RESTful web service is required to provide an application access to its web resources in a textual representation and support reading and modification of them with a stateless protocol and a predefined set of operations. By being RESTful, web services provide interoperability between the computer systems on the internet that provide these services. RESTful APIs embody the rules, routines, commands, and protocols that integrate the individual microservices, so they function as a single application. In a RESTful web service, requests made to a resource's URL will elicit a response with a payload formatted in HTML, XML, JSON, or some other format. The response can confirm that some alteration has been made to the resource state, and the response can provide hypertext links to other related resources. When HTTP is used, the operations (HTTP methods) available can comprise: GET, POST, PUT, DELETE, PATCH, and/or OPTIONS.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A System for root of trust and dynamic session management of cryptographic devices servicing cryptographic requests from multi-tenant applications in a cryptographic computing environment, comprising:

one or more processors and memory operatively coupled to the one or more processors, wherein the memory includes computer instructions which when executed by the one or more processors causes the one or more processors to perform the operations of:

a Connection Manager to provide low-latency cryptographic operations on one or more Cryptographic Devices that are local or remote to the System; by creating a block of multiple PKCS11 sessions for a client application logged into a PKCS11 session to use for crypto operations for a tenant that has established a root-of-trust in a tenant partition of the one or more Cryptographic Devices;

assigning these session blocks to the tenant partitions of said one or more Cryptographic Devices to service incoming requests from one or more of the client applications performing said crypto operations, thereby lowering a latency for handling the incoming requests compared to using a single session since multiple PKCS11 sessions in the block are available and ready to use for the tenant;

allocating incoming requests to PKCS11 sessions from pool of these session blocks for different clients for handling these crypto operations in real-time thereby providing low-latency and high-throughput for also handling crypto operations with a different client;

a Cache Store associated with said Connection Manager to support multi-tenancy on the one or more Cryptographic Devices by tracking of individual tenant's partition mapping to their respective session blocks in the pool;

managing lifecycle of said individual tenant's connection along with its sessions to said one or more Cryptographic Devices;

a Session Scheduler to provide cryptographic services with a high throughput compared to that of a single session on said one or more Cryptographic Devices by selecting session block from said Cache Store that is mapped to the tenant partition and available for use to ensure tenant isolation;

assigning an available PKCS11 session from said session block to service the crypto operations allocated to individual tenants of the Cryptographic Device(s); and a Session Health Monitor to provide resiliency by evaluating health metrics of the Session Scheduler and a set of PKCS11 sessions in the pool of session blocks allocated to individual tenant's partition mapping;

reporting an assessment of overall session block health as a measurement for throughput of crypto operations across the session blocks; and remediating and self-repairing session blocks in the event of session errors in the pool of session blocks.

2. The system of claim 1, wherein the Connection Manager in association with Session Health Monitor:

tracks a state of the PKCS11 sessions and revises session assignments of client applications depending on whether a PKCS11 session with the cryptographic device is in one or more error states; and detects, classifies and remedies of the one or more error states occurring within the pool of session blocks in view of the health metrics, thereby minimizing latency and maximizing availability of the cryptographic device services by way of the revised session assignments in view of the overall session block health.

3. The system of claim 1, wherein the Session Scheduler returns a PKCS11 session to an 'available' state in the session block once that PKCS11 session is done servicing crypto operation, and making that session re-useable for further crypto operations requests without closing it.

4. The system of claim 3, wherein the Session Scheduler in association with Session Health Monitor maintains individual PKCS11 sessions in an open state after tenant use for as long as possible to maintain the pool and so as to be available for use by an established client application.

5. The system of claim 4, wherein the Session Scheduler with Session Health Monitor tracks a range of errors during PKCS11 session usage and allocation, and repairs and remediates as necessary to ensure a healthy pool of PKCS11 sessions.

6. The system of claim 1, wherein the Connection Manager creates a PKCS11 session on demand, and at a certain point in time is assigned to a particular tenant on the cryptographic device for exclusive and permanent use with that tenant.

7. The system of claim 1, wherein the incoming requests comprise a payload such as an operand along with a connection specification, and a requested cryptographic operation such as an encrypt, decrypt, or signing.

8. The system of claim 1, wherein a Cryptographic Device is one or more of a Hardware Security Module (HSM), USB based cryptographic token and smart card.

9. The system of claim 1, wherein when the Connection Manager asks the Session Scheduler to allocate a PKCS11 session for a tenant, and execute the crypto operation on the Cryptographic Device, but, if the PKCS11 session is not available for the tenant, it will create a session block with open PKCS11 sessions exclusively for that tenant to use, and then used PKCS11 sessions will be returned to the pool for that session block for that tenant for later use, without closing or terminating the PKCS11 session.

10. The system of claim 9, wherein the Session Scheduler with the Cache Store and Session Health Monitor efficiently manages multiple PKCS11 sessions on behalf of multiple tenants or applications to service a volume of crypto requests at one or more partitions of said one or more Cryptographic Devices.

11. The system of claim 10, wherein the Connection Manager with the Cryptographic device's client dynamically establishes and maintains the life cycle of a secure communication channel with the Cryptographic Device for one or more tenants by way of adding a dedicated connection and removal, over Transport Layer Security (TLS), and then provides for PKCS11 Application Programming Interface (API) call support over said secure communication channel to service crypto requests for one or more tenants.

12. The system of claim 11, wherein the Session Scheduler runs in a loop whereby it waits until an incoming request is present in the queue, then extracts it from the queue;

examines the amount of time the request was in the queue, wherein if the request was in the queue for a predetermined time, it is discarded, and thereafter;

finds a 'free' PKCS11 session in the session block, wherein if one is found, the request is assigned to the PKCS11 session and invokes the callback mechanism with details of the PKCS11 session, and thereafter; and updates the health status of the block, examining the age of errors and resetting the one or more error states of the block when applicable.

13. The system of claim 1, wherein the Session Scheduler processes and handles session allocation requests from a session allocation request queue, wherein said requests are dequeued sequentially by waiting for a session allocation request for a PKCS11 session, and then receiving the request, upon dequeuing, performs a check operation to determine a length of time the request was in said queue, and discards or drops said request if said request was in the queue for a time matching or exceeding said length of time.

14. The system of claim 13, wherein the Session Scheduler before attempting to wait for and dequeue a further request, examines a session state of the session block, and, upon determining if the session state is ACTIVE, waits for said further request, and if not, exits, otherwise, on dequeuing said further request and passing a queue time-residency check, examines the pool of sessions to determine whether a compatible PKCS11 session is available, and, if no such compatible PKCS11 session is available within an allotted timeframe, an error is returned, and if such a PKCS11 compatible session is available, assigns that session to said further request and sets a variable for the session indicating that it is in a USE session state.

* * * * *